(12) United States Patent
Schlagenhauf et al.

(10) Patent No.: US 7,275,894 B2
(45) Date of Patent: Oct. 2, 2007

(54) ROTATIONALLY DRIVEN CUTTING TOOL

(75) Inventors: Uwe Schlagenhauf, Strassberg (DE); Peter Haenle, Inzighofen (DE)

(73) Assignee: Jorg Guhring, Albstadt (DE)

( * ) Notice: Subject to any disclaimer, the term of this patent is extended or adjusted under 35 U.S.C. 154(b) by 356 days.

(21) Appl. No.: 10/788,972

(22) Filed: Feb. 27, 2004

(65) Prior Publication Data
US 2006/0140730 A1     Jun. 29, 2006

(30) Foreign Application Priority Data
Feb. 28, 2003   (DE) ........................... 203 03 316 U

(51) Int. Cl.
   *B23B 29/03*    (2006.01)
(52) U.S. Cl. ..................... 407/37; 407/45; 407/85; 408/181; 408/153
(58) Field of Classification Search ............... 407/36, 407/37, 44, 45, 85–87; 82/158; 408/181, 408/153, 185; *B32B 29/03, 29/04*
   See application file for complete search history.

(56) References Cited

U.S. PATENT DOCUMENTS

| | | | | |
|---|---|---|---|---|
| 1,354,636 A | * | 10/1920 | Whitfield | 407/109 |
| 1,836,737 A | * | 12/1931 | Walker | 407/41 |
| 3,195,376 A | * | 7/1965 | Bader | 408/146 |
| 3,205,559 A | * | 9/1965 | Greenleaf | 407/36 |
| 3,236,125 A | * | 2/1966 | Lundgren | 408/197 |
| 3,408,722 A | * | 11/1968 | Berry, Jr. | 407/46 |
| 3,798,724 A | * | 3/1974 | Czopor | 407/93 |
| 3,839,772 A | * | 10/1974 | Shimomura et al. | 407/36 |
| 3,847,555 A | | 11/1974 | Pegler et al. | |
| 4,125,342 A | * | 11/1978 | Kress | 408/179 |
| 4,344,724 A | * | 8/1982 | Kress et al. | 407/36 |
| 4,428,704 A | * | 1/1984 | Kalokhe | 408/156 |
| 4,692,069 A | * | 9/1987 | Kieninger | 407/39 |
| 4,876,932 A | * | 10/1989 | Nessel | 82/158 |
| 4,975,002 A | * | 12/1990 | Kress et al. | 408/224 |
| 5,120,166 A | * | 6/1992 | Woerner | 407/12 |
| 5,167,473 A | * | 12/1992 | Barnett | 407/104 |
| 5,209,610 A | * | 5/1993 | Arai et al. | 407/36 |
| 5,217,330 A | * | 6/1993 | Dennstedt | 407/37 |
| 5,217,333 A | * | 6/1993 | Hunt | 408/181 |
| 5,391,023 A | * | 2/1995 | Basteck | 408/146 |

(Continued)

FOREIGN PATENT DOCUMENTS

DE         39 22 963 A1      4/1991

(Continued)

*Primary Examiner*—Monica Carter
*Assistant Examiner*—Sara Addisu
(74) *Attorney, Agent, or Firm*—Boyle Fredrickson S.C.

(57) ABSTRACT

A rotationally driven cutting tool for machining of workpieces, in which at least one cutting insert is fastened detachably in a pocket of a blade bearer so that it is clamped flatly against a base surface of the pocket. For adjustment of the blade there is a cutting insert and a fine adjustment device with which, with the aid of an adjusting screw arrangement, an adjusting element supported on a lateral wall of the cutting insert can be adjusted relative to the cutting insert. The adjusting screw arrangement comprises a threaded sleeve that is held, preferably with play, in a smooth through opening having a narrow point and comprises a screw part in functional engagement therewith that stands in a chain of pressure force with the adjusting element.

22 Claims, 4 Drawing Sheets

U.S. PATENT DOCUMENTS

| | | | | |
|---|---|---|---|---|
| 5,549,975 | A * | 8/1996 | Schulz et al. | 428/553 |
| 5,564,320 | A * | 10/1996 | Dahllof et al. | 82/130 |
| 5,735,649 | A * | 4/1998 | Boscarino et al. | 408/153 |
| 5,853,271 | A * | 12/1998 | Schanz | 408/146 |
| 5,863,156 | A * | 1/1999 | Satran et al. | 407/36 |
| 6,033,157 | A * | 3/2000 | Satran et al. | 407/37 |
| 6,056,484 | A * | 5/2000 | Mitchell et al. | 407/36 |
| 6,126,364 | A * | 10/2000 | Riviere | 407/15 |
| 6,155,753 | A * | 12/2000 | Chang | 407/92 |
| 6,231,276 | B1 * | 5/2001 | Muller et al. | 407/87 |
| 6,511,264 | B2 * | 1/2003 | Ripley | 407/36 |
| 6,619,892 | B2 * | 9/2003 | Enquist | 407/36 |
| 6,655,879 | B2 * | 12/2003 | Grehn | 407/44 |
| 6,692,198 | B2 * | 2/2004 | Kress | 407/36 |
| 6,942,431 | B2 * | 9/2005 | Pantzar et al. | 407/40 |
| 7,014,393 | B2 * | 3/2006 | Matheis | 407/37 |
| 7,029,210 | B2 * | 4/2006 | Schlagenhauf | 408/153 |
| 2002/0053266 | A1 * | 5/2002 | Enquist | 82/1.11 |
| 2002/0110428 | A1 * | 8/2002 | Noggle | 407/36 |
| 2003/0123938 | A1 * | 7/2003 | Grehn | 407/36 |
| 2004/0028492 | A1 * | 2/2004 | Jager et al. | 408/231 |

FOREIGN PATENT DOCUMENTS

| | | |
|---|---|---|
| DE | 44 25 796 A1 | 2/1995 |
| DE | 100 47 079 A1 | 4/2002 |
| DE | 101 09 783 A1 | 9/2002 |
| GB | 1164147 A | 9/1969 |

* cited by examiner

ROTATIONALLY DRIVEN CUTTING TOOL

BACKGROUND OF THE INVENTION

1. Field of the Invention

The present invention relates to a tool, in particular a rotationally driven cutting tool, and in particular a cutting tool for the fine machining of workpieces.

2. Description of the Related Art

Cutting tools, in particular for the fine machining of workpieces, in which at least one cutting insert, fastened so as to be removable, is provided on a tool element, have long been known, for example from DE 38 03 188 A1. The cutting insert, in the form of a polygon plate, is thereby seated in a correspondingly formed pocket of the blade bearer, and is pressed flatly or in planar fashion against a base surface of the pocket by a clamping screw that penetrates the cutting insert essentially centrically.

So that, after the cutting insert has been installed, a precise positional fixing and orientation of the functional edges of the tool is possible in relation to the axis of rotation, such tools are often equipped with a fine adjustment device. The cutting insert is thereby supported with a lateral wall against an adjusting element that can be displaced relative to the cutting insert with the aid of an adjusting or set screw arrangement. Such fine adjustment devices are known for example from DE 195 21 599 A1, from JP 10-277839 A, from U.S. Pat. No. 3,662,444, or from DE 42 43 586 A1. Instead of an adjusting screw, an adjusting eccentric has also already been used, as is known for example from DE 29 48 250 C2.

A tool as recited below is known from DE 100 60 283 C1. The adjusting element is thereby formed by an adjusting bored part that has a continuous inner winding and is supported via a semicylindrical outer surface of a corresponding opening in the blade bearer. The adjusting screw arrangement is formed by a differential screw whose outer threading, having a first orientation, engages with the inner threading of the adjusting element, and whose threaded segment, having a second orientation, engages with a threaded bore in the blade bearer. The differential screw can alternatively be actuated either from the side of the cutting insert or, if the threaded bore in the blade bearer is fashioned as a through bore, from the side of the screw part that engages with the blade bearer.

With this known fine adjustment device, it is certainly possible to carry out the required adjustments of the cutting insert, said adjustments serving mainly for the reliable compensation of manufacturing tolerances at the cutting insert and/or at the receiving pocket. However, it has turned out that the design of the known fine adjustment device requires a relatively expensive machining of the blade bearer. This has a negative effect in particular if the tools have a relatively small nominal diameter, or for example if particularly difficult-to-cut materials are used for the blade bearer.

The present invention is therefore based on the object of developing a tool according to the below discussion in such a way that a fine adjustment of the cutting insert can be realized even for tools having the smallest nominal diameter, while providing an economical manufacturing method, even if materials that are particularly difficult to cut, such as for example hard materials, are used in the area of the blade bearer. This object is achieved by the features of the below claims.

According to the present invention, a threaded sleeve o: bushing of the adjustment screw arrangement is placed loosely in a through opening in the blade bearer. Because of the loose placement of the threaded sleeve, the through opening can be formed so as to be smooth on the inside. The threaded sleeve is placed into the through opening from the side facing the cutting insert, and is supported at the narrow point in such a way that the adjusting screw arrangement remains capable of being actuated through the narrow point. This design makes it possible to form the inner through opening in the blade bearer as simply as possible, for example as a smooth cylindrical opening. The fine adjustment device can thus be used even for tools having a very small nominal diameter, without having to accept a significant cutting expense in the machining of the blade bearer. The through opening, smooth on the inside, can be manufactured very economically, even if very difficult-to-cut materials are used on the sides of the blade bearer. These are for example hard materials such as carbide, nitride, or boride, or also nonmetallic hard materials and hard materials systems, as are known for example in the form of mixed carbides, carbon nitrides, carbide-boride combinations, or as mixed ceramics and nitride ceramics. Hard materials of this sort are often sintered materials. The construction according to the present invention of the fine adjustment device even makes it possible to create the through opening in the blade bearer already before the final sintering process, for example already during the compression molding process or after a pre-sintering method step. This is possible because the adjusting screw arrangement is placed loosely in the through opening of the blade bearer, so that dimensional and/or tolerance deviations with respect to the position and shape of the inner through opening cannot effectively have an adverse effect on the functioning of the fine adjustment device. In this way, the design according to the present invention results in the particular additional advantage that when the cutting insert has been installed the components of the fine adjustment device are held in captive fashion in the through opening of the blade bearer, underneath the cutting insert. Even given a loosening of the preloading force of the adjusting element, which can be caused for example by vibrations of the tool, it is ensured that no components of the fine adjustment device can be lost.

A particular advantage of the tool according to the present invention is that the fine adjustment device for the cutting insert claims very little constructive space, thus creating the possibility that, even in the embodiment having small nominal diameters, the tool can be equipped with standardized (DIN/ISO) indexable inserts. Down to nominal diameters of 12 mm, standardized indexable inserts (for example size 04) can be used, while at larger nominal diameters (for example, 16 mm), correspondingly larger standardized indexable inserts can be used, for example size 06. In addition, the inventors were able to manufacture tools having a nominal diameter of 6 and 5 mm, and to carry out the fine adjustment of the cutting insert by using a threaded sleeve having a thread dimension of M1.2 or M0.8 respectively.

Advantageous developments of the present invention are the subject matter of the subclaims. One development is particularly suited for extremely small dimensioning of the fine adjustment device, for example for tools having a nominal diameter of less than 16 mm. It has turned out that with threaded sleeve diameters of less than 2 mm, pressure forces can easily be exerted on the screw or threaded bolt, and thus on the adjusting element, that are sufficient for the fine adjustment of the blade(s) even if the cutting insert is completely fastened in the pocket. The inner threading of the threaded sleeve can even be manufactured easily in the range down to M0.8, because the selection of material for the components of the fine adjustment device is independent of the material of the cutting insert and/or of the blade bearer.

An advantageous alternative for the construction is represented by the below-described development that is advantageously to be used if tools having a larger nominal diameter are equipped with a fine adjustment device according to the present invention. For an essentially rotationally fixed accommodation of the threaded sleeve in the through opening, a solder or glue connection can be used. However, it is equally possible for the rotational securing of the threaded sleeve to be provided by a special shaping of the sleeve cross-section on the one hand and of the cross-section of the through opening on the other hand.

In this variant, it is advantageous to select the inner width of the narrow point smaller than the outer diameter of the screw bolt that is screwed into the threaded sleeve, so that protection against loss is provided.

The developments according to others of the claims are provided in order to influence the transmission of force from the fine adjustment device to the cutting part as advantageously as possible. These developments make it possible to further reduce the dimensions of the fine adjustment device, and thus to equip tools having a still smaller nominal diameter with the fine adjustment device according to the present invention, in particular if, as a material for the blade bearer, a hard metal is used, or another hard material, or a material having significantly greater strength and therefore significantly greater resistance to cutting.

The development of another claim improves the flow of force to the blade bearer, and minimizes the contact stresses that can have a critical effect in particular with the use of hard materials.

If the cutting insert of the tool is formed by an indexable insert, it is advantageous if the adjusting element is supported on a flank or free surface of the indexable insert. In this way, not only is the cutting edge protected, but the bevel of the flank is also advantageously used as a component of a wedge drive for a deflection of force and amplification of force.

In principle, the realization according to the present invention of the fine adjustment device is not limited to a particular geometry of the pocket in the blade bearer or of the cutting insert. However, with another of the developments, there results a particularly well-defined positional adjustment of the cutting insert with the best possible protection of the cutting insert on the one hand and of the blade bearer on the other hand.

The through opening provided in the blade bearer for accepting the adjusting screw arrangement can be oriented arbitrarily with respect to the base surface of the pocket of the blade bearer, and can for example also be oriented parallel to the base surface of the pocket. However, if, the through opening has an extension that is set at an angle to the base surface of the pocket of the blade bearer, there results the particular advantage that the bevel of the flank can also be used for force deflection and force transmission.

There is also no limitation in principle for the shape of the cross-section of the through opening in the blade bearer. The decisive advantage from the manufacturing point of view, in particular with the use of high-strength materials in the area of the blade bearer, results from the fact that the inner surface of the opening need comprise no undercuts, and that only very low demands need be made on the dimensional accuracy of the inner through opening, because the adjusting screw arrangement is housed in the through opening with a degree of play. Particular manufacturing-related advantages result from yet another development. Such an opening can even be formed, with the sufficient low dimensional accuracy and rough positional tolerance, in the tool bearer, if this bearer is for example made of a sintered material. The positional and dimensional precision that can be achieved thereby is easily sufficient to accommodate the adjustment screw arrangement, having arbitrary dimensions, in the through opening in a captive fashion that is nevertheless reliably accessible from the outside.

The narrow point in the through opening can also be made in various ways, such as for example by driving in a transverse pin that protrudes into the opening. However, a particularly simple and effective construction results according to another development. According to this development, if the inner through opening is made in the molding process, i.e., during the pressing process of the blade bearer made of a hard material, all subsequent machining after the sintering process can be omitted.

Moreover, advantageous materials are indicated for the blade bearer and/or the cutting insert, with which the advantages of the inventive construction are utilized especially well. However, it is to be noted that the present invention is not limited to this choice of materials.

At least some selected functional surfaces of the tool and/or of the fine adjustment device, preferably in those areas that are exposed to increased wear, can, in order to improve durability, be provided at least in some areas, such as for example in the area of the blades or in the area of the force-transmitting contact surfaces, with a coating that is preferably realized as a hard material layer. This can for example be a layer of diamond, preferably nanocrystalline diamond, of titanium nitride, or of titanium aluminum nitride. Advantageous realizations of the coating form the subject matter of others of the claims.

Additional advantageous realizations of the present invention form the subject matter of the subclaims.

In the following, exemplary embodiments of the present invention are explained in more detail on the basis of schematic drawings.

DETAILED DESCRIPTION OF THE PREFERRED EMBODIMENTS

Figure 1:
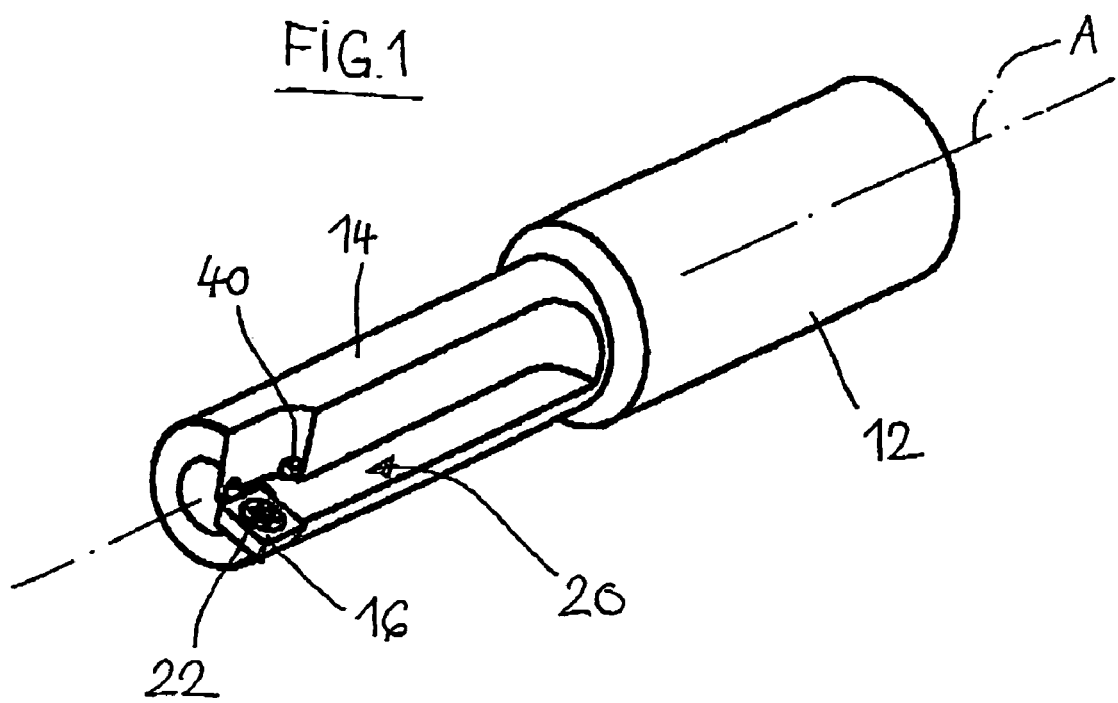
FIG. 1 shows a perspective view of a rotationally driven cutting tool for the fine machining of workpieces, for the illustration of the basic design of the tool.

FIG. 1 schematically shows a preferably rotationally driven cutting tool having a shaft 12 and having a blade bearer 14. Blade bearer 14 bears on its front end, in detachable fashion, a cutting insert 16, which is for example fashioned as an exchangeable plate or disk or indexable insert.

The insert can for example be formed by a known indexable insert according to DIN/ISO, preferably up to nominal tool diameters of 12 mm, but can equally be formed by a special plate for client-specific applications. Given a nominal diameter of 12 mm, an indexable insert of size 04 is preferably used, and for a nominal diameter of 16 mm an indexable insert of size 06 is preferably used. The indexable inserts are preferably made of a hard, wear-resistant material, such as for example hard metal, polycrystalline diamond, cubic boron nitride, cermet, ceramic, or some other hard material, and can be coated in all variants.

In detail, cutting insert 16 is seated in a pocket 18, formed so as to have angles, of a cutting chamber designated 20. The blade bearer is pressed flatly against a base surface 24 by means of a clamping screw 22. The arrangement is preferably realized such that an axis 26 of an inner threading 28 of clamping screw 22 that accepts clamping screw 22 is offset slightly, in relation to a center 30 of a counterbore 32 in cutting insert 16, towards the interior corner of pocket 18, whereby it is ensured that when clamping screw 22 is tightened, cutting insert 16 is pressed firmly and preferably flatly against supporting walls 34, 36 of pocket 18.

Reference character 40 designates the opening of a duct for coolant and lubricants. The cutting tool described briefly above is fashioned such that when cutting insert 16 is in place, blades 42, 44 come to be situated in a predetermined positional relation to axis A. The pocket is correspondingly machined from cutting chamber 20, preferably in such a way that supporting walls 34, 36 enclose an angle that corresponds to the corner angle EW of cutting insert 16. Because such cutting tools are used primarily for the fine machining of workpieces, care is to be taken that tolerances in the manufacturing of cutting insert 16 and/or of pocket 18 that accepts the cutting insert can be compensated. For this purpose, a fine adjustment device is provided that is described in more detail below on the basis of FIGS. 3 to 7.

In principle, the arrangement is made such that the integration of the fine adjustment device into the cutting tool requires a minimal machining, in particular a minimal cutting in the area of blade bearer 14, so that materials having a significantly higher degree of strength, such as for example hard materials, i.e., hard metals or Cermet materials, can be used in the area of the blade bearer.

Figure 2:
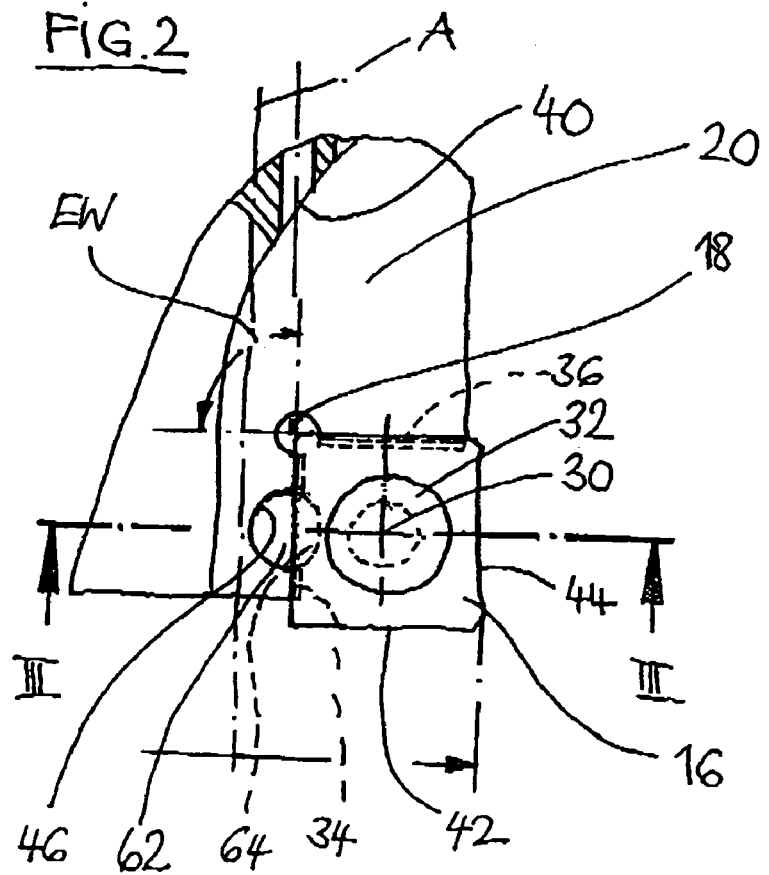
FIG. 2 shows a schematic top view of the front area of the cutting tool according to FIG. 1, in an enlarged scale.
Figure 3:
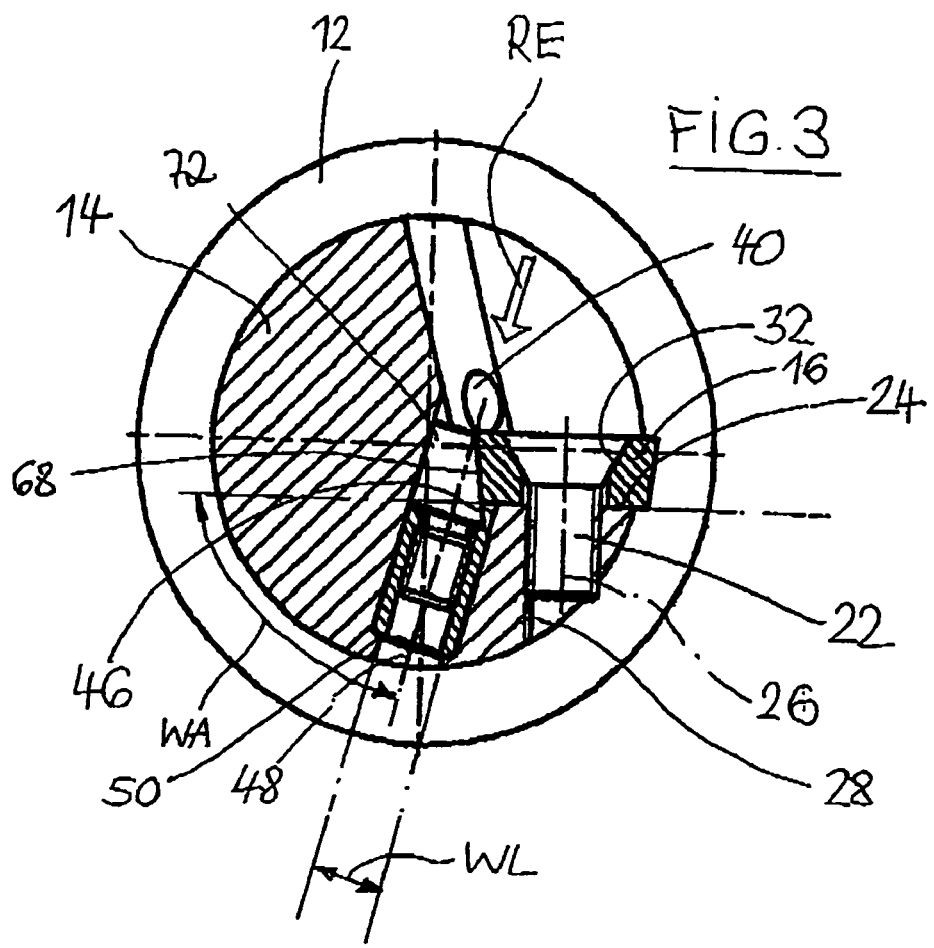
FIG. 3 shows the section along III-III in FIG. 2.
Figure 4:
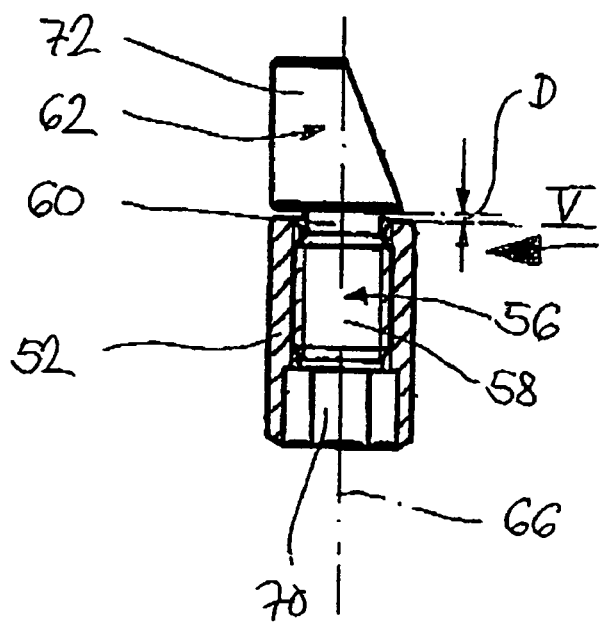
FIG. 4 shows a detailed view of the adjusting screw arrangement of the specific embodiment according to FIGS. 1 to 3.
Figure 5:
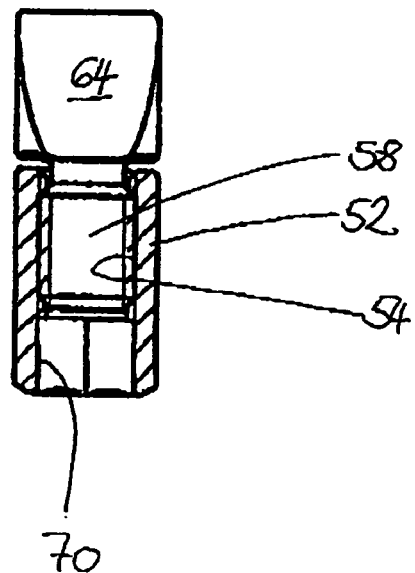
FIG. 5 shows the view corresponding to "V" in FIG. 4.
Figure 6:
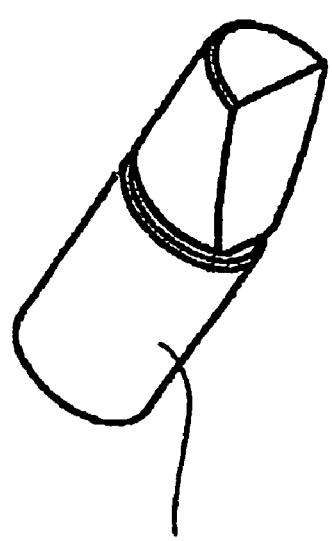
FIGS. 6 and 7 show perspective views of the adjusting screw arrangement according to FIGS. 4 and 5.
Figure 7:
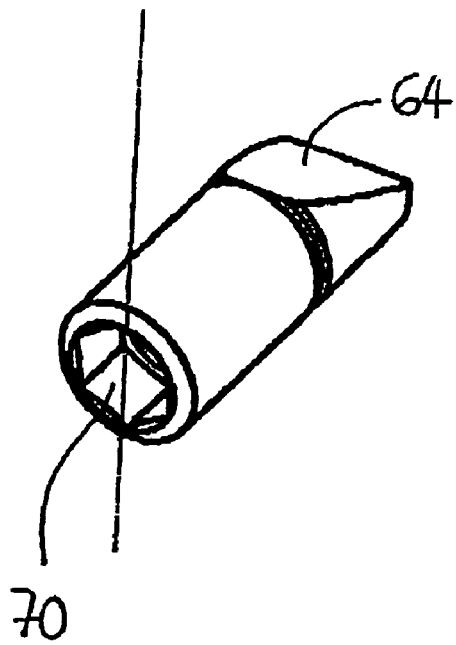

As is shown in FIGS. 2 to 7, in blade bearer 14 a through opening 46 is provided, which in the depicted exemplary embodiment is formed as a cylindrical, stepped opening having an axis 48 that is set at an angle WA to the plane of base surface 24. Due to the stepped formation of cylindrical opening 46, opening 46 thus has a narrow point designated 50, formed by the material shoulder of stepped inner opening 46. The inner width of narrow point 50 is designated WL, as can be seen in FIG. 3. An adjusting screw arrangement according to FIGS. 4 to 7 is placed so as to have a degree of play into through opening 46, which is provided with narrow point 50 and which is smooth on the inside, i.e., does not have undercuts; this placement takes place from the side of opening 46 facing cutting insert 16. The direction of placement is indicated in FIG. 3 by arrow RE.

The adjusting screw arrangement is made up of two parts, namely a threaded sleeve 52 and a screw part 56 that engages functionally with the inner threading of this sleeve. The threaded section 58 of this screw part goes over via a step 60 into a head 62 having a wedge-shaped beveling. Beveled wedge surface 64 of head 62 is oriented towards center axis 66 in such a way that when adjusting screw arrangement 52, 56 is in place and is placed under pressure, this surface can be brought to be seated flatly on a flank 68 of cutting insert 16.

In order to carry out a fine adjustment of cutting insert 16 in order to compensate manufacturing tolerances, or in order to remove play that may still exist between clamping screw 22 and cutting insert 16, head 62, having a wedge-shaped beveling, of screw part 56 is pressed flatly with increasing force against flank 68 of cutting insert 16 by rotating threaded sleeve 52, which is placed into cylindrical inner opening 46 with radial play, in such a way that distance D between head 62 and threaded sleeve 52 increases. For this purpose, threaded sleeve 52 is provided on its side facing narrow point 50 with an interior hexagonal opening 70, whose width across flats is not larger than inner width WL of narrow point 50. In this way, it remains possible to actuate adjusting screw arrangement 52, 56 through the narrow point.

As is shown in FIGS. 2 and 3, peripheral surface segment 72 facing wedge surface 64 is supported essentially flatly on the inner wall of opening 46, whereby the pressure forces that are transmitted and amplified via wedge surfaces 68, 64 can be introduced into blade bearer 14 with an advantageous flow of force, even if the inner diameter of opening 46 is slightly larger than the outer diameter of adjusting head 62.

The special feature of the fine adjustment device described above is thus that it is necessary to carry out only a minimum machining on the sides of blade bearer 14 in order to integrate the fine adjustment device into the tool. In other words, the functional surfaces required on the sides of the blade bearer are extremely easy to form, in particular without requiring cutting, because they can be kept free of all undercuts, and because the requirements on the positional and dimensional tolerance of through opening 46 can be relatively coarse without impairing the functional capacity of the fine adjustment device. In other words, even axis 48 of opening 46 need not coincide exactly with axis 66 of adjusting screw arrangement 52, 56 in order to enable realization of a very effective radial adjusting that protects the cutting insert.

The inventive measures described above make it possible to realize a fine adjustment of the cutting inserts even in tools in which the blade bearer can be processed only at an extremely high expense. This is for example the case if extremely strong materials are used, such as for example hard materials, in particular sintered materials such as for example a hard metal or a Cermet material. If materials of this sort, in particular a sintered material, are used for blade bearer 14, the inventive design of the fine adjustment device described above makes it possible to form opening 46 that is to be made in the blade bearer together with narrow point 50 already in the sintering blank, without requiring subsequent machining, in particular an inner machining of the finished part. This is because it is not necessary to meet stringent dimensional requirements with respect to the position and shape of opening 46 and of narrow point 50.

It has turned out that the adjusting screw arrangement shown in FIGS. 2 to 7 is able to apply sufficiently large displacement forces to the cutting insert even if the adjusting screw arrangement has very small dimensions, such as for example a threaded sleeve outer diameter of less than 2 mm. Inner threading 54 of threaded sleeve 52 can easily be realized as a threading having size M0.8. With small threaded sizes, a fine threading is preferably used, while for larger threads regular threadings can be used. This small dimensioning of the adjusting screw arrangement makes it possible to equip rotationally driven cutting tools with cutting inserts that can be finely adjusted even if the nominal diameter of the tool is significantly smaller than 16 mm, and even smaller than 6 mm, and if an extremely strong material, for example a hard material, is used as the material for the blade bearer. The use of sintered materials is particularly preferred, because this enables simple formation of opening 46, 50 during the compression molding process, e.g. with the aid of a suitable core; that is, the opening can be made in the blade bearer during the molding process, so that no further machining is required after the sintering.

The following tools can be manufactured with the inventive fine adjustment device in a particularly economical and effective fashion:
1. Nominal diameter 16 mm with DIN/ISO indexable insert size 06;
2. Nominal diameter 12 mm with DIN/ISO indexable insert size 04;
3. Nominal diameter 6 mm with special indexable insert; thread dimension of the threaded sleeve M1.2;
4. Nominal diameter 5 mm with special indexable insert; thread dimension of the threaded sleeve M0.8.

For the additional improvement of the machining quality, cutting insert 16 is provided, at least in the area of the most highly-stressed segments, i.e., in the area of cutting edges 42, 44 and the cylindrically ground bevel surface, with a coating that is preferably fashioned as a layer of hard material. For this hard material layer, possibilities include for example diamond, preferably nanocrystalline diamond, titanium nitride or titanium aluminum nitride. Particularly suitable are, among others, a titanium aluminum nitride layer and what is known as a multilayer coating, marketed under the mark "Fire I" by the firm Gühring oHG. This is a TiN—/(Ti,Al)N multilayer coating. A coating as a soft and/or hard layer can also be used in the area of the fine adjustment device.

Particularly preferably, it is possible both in the area of the cutting insert and in the area of the fine adjustment device to use an anti-wear protective layer made essentially of nitrides having metal components Cr, Ti, and Al, and preferably having a low portion of elements for grain refinement, whereby the Cr portion is from 30 to 65%, preferably 30 to 60%, and particularly preferably 40 to 60%, the Al portion is from 15 to 35%, preferably 17 to 25%, and the Ti portion is from 16 to 40%, preferably 16 to 35%, and particularly preferably 24 to 35%, with respect to all metal atoms in the overall layer. Here, the layer can have a one-layer construction, with a homogenous mixed phase, or it can be made up of a plurality of layers that are homogenous in themselves, made up alternately of, on the one hand, $(Ti_xAl_yY_z)N$ with x=0.38 to 0.5, y=0.48 to 0.6, and z=0 to 0.04, and on the other hand of CrN, whereby the uppermost layer of the anti-wear protective layer is preferably formed by the CrN layer.

The coating described above can also be provided in the area of functional surfaces 54, 56, 64 of fine adjustment device 52, 56, at least in some areas. However, a soft material layer as known for example from older patent application P 100 52 681.0, whose disclosure is expressly incorporated into the present application, can also be provided either as an alternative to or in combination with the hard material layer.

Figure 8:
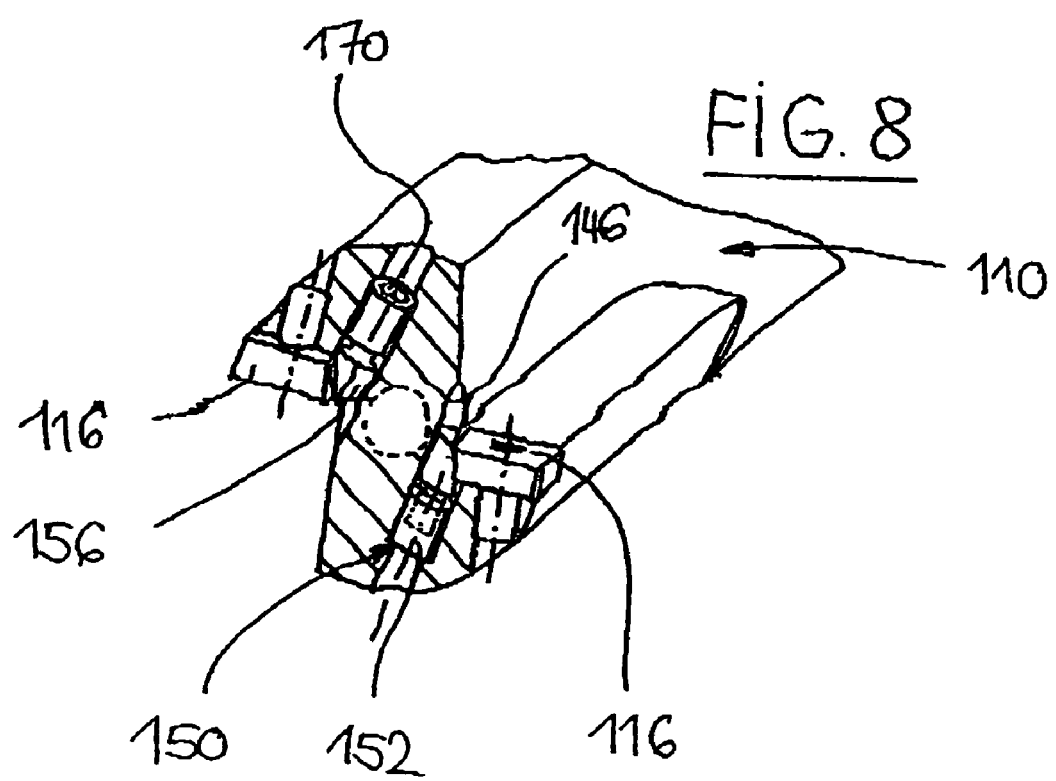
FIG. 8 shows a schematic perspective and partial cutaway view of a modified specific embodiment of the cutting tool.

FIG. 8 shows a further specific embodiment of a cutting tool, namely a rotationally driven cutting tool. For the simplification of the description, those components corresponding to the components of the specific embodiment according to FIGS. 1 to 7 are provided with similar reference characters, to which a "1" has been prefixed.

The principal difference from the specific embodiment according to FIGS. 1 to 7 is that tool 110 is equipped with two cutting inserts 116. An adjusting screw arrangement made up of a threaded sleeve 152 and a screw part 156 is allocated to each cutting insert 116. Each adjusting screw arrangement is in turn placed into a respective stepped opening 146 having a narrow point 150, from the side of opening 146 facing cutting insert 116. Inner hexagonal opening 170 can be accessed from the other side, through narrow point 150, so that a fine adjustment of cutting insert 116 is possible.

As is also the case in the specific embodiment according to FIGS. 1 to 7, the variant according to FIG. 8 provides the additional advantage that adjusting screw arrangement 152, 156 is held in captive fashion in opening 146 when cutting insert 116 is installed.

Figure 9:
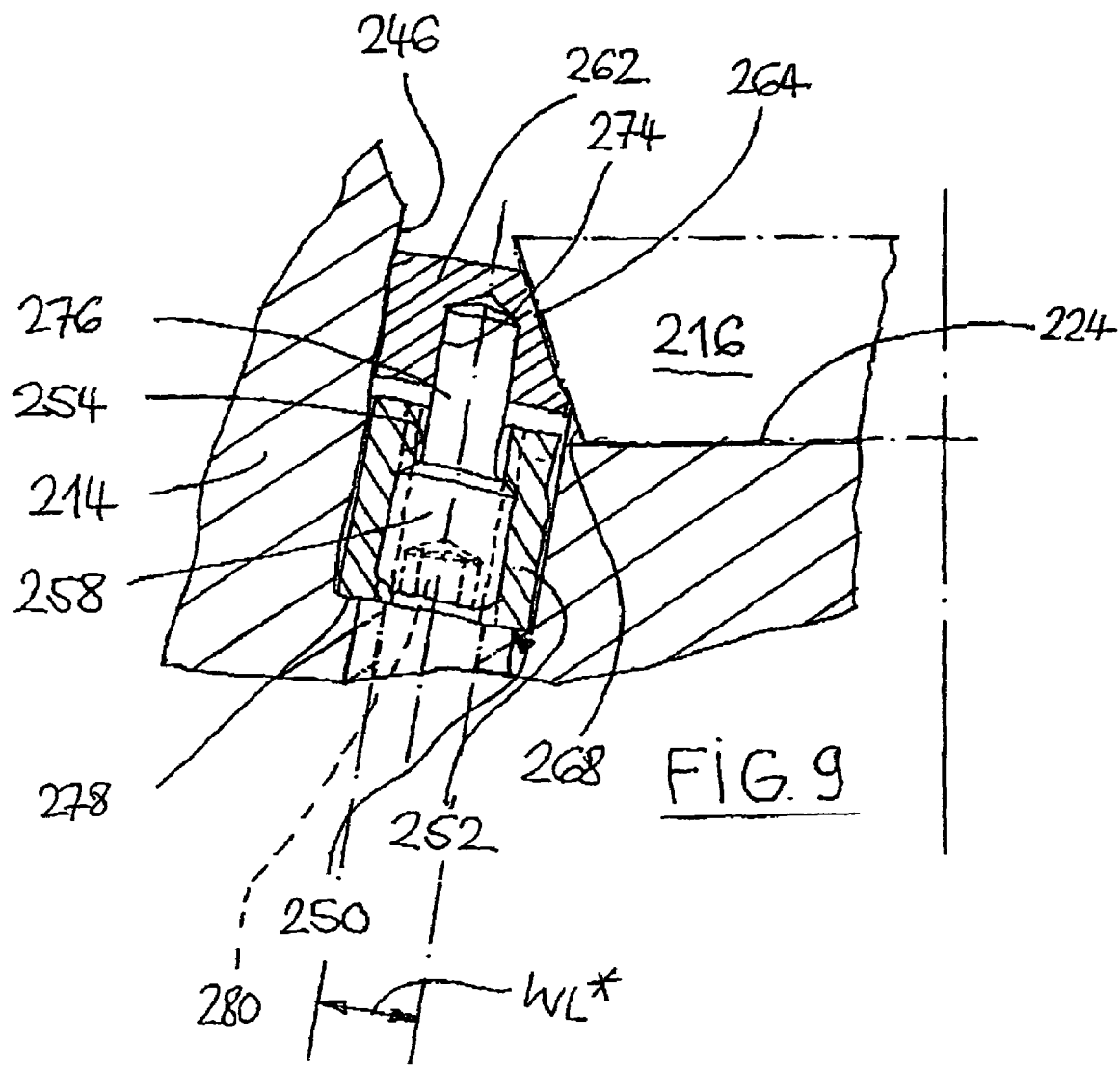
FIG. 9 shows a schematic sectional view (similar to that of FIG. 3) of an additional specific embodiment of the cutting tool, with a modification of the fine adjustment device for a cutting insert.

Finally, on the basis of FIG. 9 a further specific embodiment of the cutting tool is described. Here as well, those components that correspond to the components of the previously described exemplary embodiments are designated with similar reference characters, to which however a "2" has been prefixed. Here as well, cutting insert 216 is loaded by a wedge-shaped beveled adjusting element 262 whose wedge surface 264 is supported flatly on a flank 268 of cutting insert 216. Adjusting element 262 is held in positively locking fashion, but with play, in a stepped inner opening 246 of blade bearer 214.

Adjusting element 262 accepts, in a centrically positioned blind hole 274, a cylindrical pin segment 276 that goes over into a threaded segment 258. Threaded segment 258 stands in functional engagement with an inner threading 254 of a threaded sleeve 252 that is placed loosely, or with play, into opening 246, said threaded sleeve being supported on a shoulder 278 of through opening 246. Shoulder 278 thus forms a narrow point 250 through which an inner hexagonal opening of threaded segment 258 can be actuated.

Preferably, threaded sleeve 252 is secured against rotation in opening 246, for example by gluing or soldering. However, it is also possible to fix the threaded sleeve so as to be rotationally secure in positively locking fashion, in a correspondingly shaped or equipped opening 246. In FIG. 9, solid lines indicate the variant in which narrow point 250 of opening 246 has an inner width that is larger than the outer threading of threaded segment 258. Broken lines indicate a modification in which inner width WL* is smaller than the outer diameter of threaded segment 258, whereby in this variant as well a complete securing against loss of the adjusting screw arrangement can be ensured.

In other respects, the specific embodiment according to FIG. 9 has the advantages described above in connection with the specific embodiment according to FIGS. 1 to 8. The construction according to FIG. 9 can be advantageously used if tools having a larger nominal diameter are to be equipped with the fine adjustment device of the cutting insert.

Of course, deviations from the described specific embodiments are possible without abandoning the basic idea of the present invention. Thus, it is for example also possible to hold threaded sleeve 252 so as to be essentially secured against rotation in opening 246 by providing a corresponding matching of the cross-sections of threaded sleeve 252 on the one hand and of inner opening 246 on the other hand, for example by providing a polygonal cross-section. The decisive factor is only that the threaded sleeve, as well as adjusting element 262, are able to be accepted in opening 246 with a certain degree of radial play, thus making it possible to manufacture the inner opening with a narrow point without a complicated and dimensionally precise machining of the blade bearer, even if the blade bearer is manufactured from a particularly high-strength material.

Other forms of securing against rotation, such as for example index pins, can also be used, which can for example be placed in captive fashion into the blade bearer from outside.

In the described specific embodiments, the narrow point is formed by a material shoulder. This is not absolutely required. It is equally possible to form the opening so as to have a constant cross-section throughout, and to form the narrow point by driving in support elements, for example pins, from the outside, far enough that the threaded sleeve can be reliably supported.

In the depicted specific embodiments, the fine adjustment device is situated in an essentially cylindrical blade bearer. However, it can also be situated in a cartridge that is built into a cartridge carrier, for the manufacture of the tool.

The present invention is also not limited to a particular type of tool. It is also conceivable to use the tool as a standing tool, although the particular advantages come into play when the tool is used as a rotationally driven fine machining tool.

It can also be provided that the cutting insert is adjusted in a plurality of directions. In this case, a plurality of fine adjustment devices are allocated to one cutting insert.

The arrangement can also vary within wide limits with regard to the orientation of the through opening with respect to the base surface or with respect to the contact surface on the cutting insert.

The blade bearer of the exemplary embodiments described above is made of a hard material, in particular a sintered material, such as for example a hard metal or a Cermet material. In this way, the criteria of abrasive wear and elevated temperature hardness can in particular be specially taken into account. However, other high-strength materials can also be used, such as for example HSS, HSSE, HSSEBM, or similar high-strength steel materials.

The hard materials used can be present in the form of a carbide, a nitride, a boride, or a non-metallic hard material, or a hard material system, such as are known for example in the form of mixed carbides, carbon nitrides, carbide-boride combinations, or mixed ceramics and nitride ceramics. Particularly advantageous here are those hard materials that can be manufactured as sintered molded parts. Here, deviating from the previously described variants, opening 46, 146 or 246 in the blade bearer can also be manufactured by providing a stepped bore in a pre-sintered element, which is relatively easy to machine in comparison with a finished sintered part.

The invention claimed is:

1. A rotationally driven cutting tool for the fine machining of workpieces, in which at least one cutting insert is fastened detachably in a pocket of a blade bearer in that it is clamped flatly against a base surface of the pocket, whereby for the adjustment of a blade there is allocated to the cutting insert a fine adjustment device with which, with the aid of an adjusting screw arrangement, an adjusting element that is supported on a lateral wall of the cutting insert can be adjusted relative to the cutting insert, characterized in that the adjusting screw arrangement comprises a threaded sleeve that is held with play in a smooth through opening having a constriction and comprises a screw part standing in functional engagement therewith, the screw part operationally engaged with the adjusting element for securing a position of the adjusting element relative to the cutting insert, whereby the adjusting screw arrangement is placed into the through opening from the side facing the base surface, and can be actuated from the other side through the constriction.

2. The tool as recited in claim 1, characterized in that the constriction has an inner width (WL) that is smaller than the outer diameter of the threaded sleeve, and in that the screw part of the adjusting screw arrangement is formed by a screw bolt whose threaded segment goes over via a step into a preferably wedge-shaped beveled head that forms the adjusting element.

3. The tool as recited in claim 1, characterized in that the screw part is formed by a screw bolt that is engaged with the threaded sleeve that is held in essentially rotationally secure fashion in the through opening, the threaded segment of said bolt going over into a cylindrical pin segment that engages, with a degree of play, in a blind opening of an adjusting body that is preferably laterally beveled and that forms the adjusting element.

4. The tool as recited in claim 3, characterized in that the constriction has an inner width (WL*) that is smaller than the outer diameter of the screw bolt.

5. The tool as recited in claim 1, characterized in that the adjusting element is seated flatly on the lateral wall of the cutting insert.

6. The tool as recited in claim 1, characterized in that the adjusting element on the side facing the cutting insert is supported largely flatly on an inner wall of the through opening.

7. The tool as recited in claim 1, wherein the cutting insert is indexable, and the adjusting element is supported on a flank of the cutting insert.

8. The tool as recited in claim 1, characterized in that the pocket that accepts the cutting insert has two supporting walls which together enclose an angle that corresponds to a corner angle (EW) of the cutting insert.

9. The tool as recited in claim 1, characterized in that the through opening in the blade bearer has an extension along an axis that is placed at an angle (WA) to the base surface of the pocket of the blade bearer.

10. The tool as recited in claim 9, characterized in that the through opening is formed by an essentially cylindrical opening.

11. The tool as recited in claim 1, characterized in that the constriction in the through opening is formed by a material shoulder.

12. The tool as recited in claim 1, characterized in that the blade bearer is formed of at least one of a hard material, a sintered material, a hard metal, or a Cermet material.

13. The tool as recited in claim 12, characterized in that the hard material is further defined as at least one of a carbide, a nitride, a boride, a non-metallic hard material, mixed carbides, carbon nitrides, carbide-boride combinations, mixed ceramics, or nitrides ceramics.

14. The tool as recited in claim 1, characterized in that the inner winding of the threaded sleeve has a size in the range from M.08 to M16.

15. The tool as recited in claim 1, characterized in that at least one of selected functional surfaces of the tool that are exposed to increased wear, the cutting insert, or the fine adjustment device is provided with a coating.

16. The tool as recited in claim 15, characterized in that the coating is realized as a hard material layer.

17. The tool as recited in claim 16, characterized in that the hard material layer is made of at least one of diamond, nanocrystalline diamond, TiN, (Ti,Al)N, a multilayer coating, of a layer made up of nitrides having metal components Cr, Ti, and Al; a layer made up of nitrides having metal components with a low portion of elements for grain refinement, whereby the Cr portion is from 30% to 65%, the Al portion is from 15% to 35%, and the Ti portion is from 16% to 40% with respect to all metal atoms in the overall layer.

18. The tool as recited in claim 17, characterized in that the construction of the overall layer is made of a homogenous mixed phase.

19. The tool as recited in claim 17, characterized in that the construction of the overall layer is made up of a plurality of individual layers that are homogenous in themselves and formed from at least one of a balanced mixture having 38%-50% Ti, 48%-60% Al, 0%-4% Y,N, and CrN.

20. The tool as recited in claim 1, characterized in that the cutting insert is formed by a DIN/ISO insert that is indexable.

21. The tool as recited in claim 1, characterized in that the cutting insert is made of at least one of a hard material, a wear-resistant material, a hard metal (HM) material, a polycrystalline diamond (PKD) material, a cubic boron nitride (CBN) material, a Cermet material, or a ceramic material.

22. The tool as recited in claim 1 wherein the screw part is held in compression relative of the adjusting element to allow translation of the cutting insert upon translation of the adjusting element.

* * * * *